(12) United States Patent
Rodriguez et al.

(10) Patent No.: US 7,428,473 B2
(45) Date of Patent: Sep. 23, 2008

(54) HEALTH MONITORING IN A SYSTEM OF CIRCUMVENTION AND RECOVERY

(75) Inventors: Manuel I. Rodriguez, St. Petersburg, FL (US); James E. Lafferty, St. Petersburg, FL (US); Edward R. Prado, Palm Harbor, FL (US); Jamal Haque, Tampa, FL (US); Keith A. Souders, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/672,061

(22) Filed: Feb. 7, 2007

(65) Prior Publication Data

US 2008/0189075 A1    Aug. 7, 2008

(51) Int. Cl.
G21C 17/00 (2006.01)
G06F 11/30 (2006.01)
G06F 15/00 (2006.01)

(52) U.S. Cl. .............. 702/185; 713/300; 713/340; 714/11; 714/25; 714/797; 700/2; 700/79; 700/82

(58) Field of Classification Search ............... 702/182, 702/185, 186, 189; 713/300, 330, 340; 714/11, 714/25, 797; 700/2, 79, 82
See application file for complete search history.

(56) References Cited

U.S. PATENT DOCUMENTS

| 5,923,830 | A | * | 7/1999 | Fuchs et al. | ............... | 714/11 |
| 6,141,770 | A | * | 10/2000 | Fuchs et al. | ............... | 714/11 |
| 6,799,155 | B1 | * | 9/2004 | Lindemann et al. | ......... | 703/24 |
| 6,921,051 | B2 | * | 7/2005 | Lopata et al. | ............ | 244/158.9 |
| 7,260,742 | B2 | * | 8/2007 | Czajkowski | .............. | 714/21 |

OTHER PUBLICATIONS

George et al., 'SEE Sensitivity Trends in Non-Hardened High Density SRAMs with Sub-Micron Featrue Sizes', Jul. 2003, IEEE Publication, pp. 83-88.*

* cited by examiner

Primary Examiner—Edward Raymond
Assistant Examiner—Elias Desta
(74) Attorney, Agent, or Firm—Fogg & Powers LLC

(57) ABSTRACT

A system comprises at least one non-hardened processor configured to run a plurality of mission related processes; at least one threat detector configured to detect one or more conditions which indicate the onset of a threat to the operation of the at least one non-hardened processor; and at least one hardened processor configured to elevate at least one health monitoring process of the at least one non-hardened processor from a background process to a foreground process when the at least one threat detector detects a condition indicating the onset of a threat, wherein the at least one hardened processor manages the operation of the at least one non-hardened processor based on the results of the at least one health monitoring process.

20 Claims, 4 Drawing Sheets

HEALTH MONITORING IN A SYSTEM OF CIRCUMVENTION AND RECOVERY

CROSS-REFERENCE TO RELATED APPLICATIONS

This application is related to co-pending U.S. patent application Ser. No. 11/672,068, filed on even date herewith, entitled "A SYSTEM OF CIRCUMVENTION AND RECOVERY IN A MULTI-FUNCTION SYSTEM", hereby incorporated herein by reference, and referred to herein as the "'14287 Application".

This application is related to co-pending U.S. patent application Ser. No. 11/672,056, filed on even date herewith, entitled "A METHOD FOR IMPLEMENTING A CONTROL CHANNEL IN A SYSTEM OF CIRCUMVENTION AND RECOVERY", hereby incorporated herein by reference, and referred to herein as the "'14154 Application".

This application is related to co-pending U.S. patent application Ser. No. 11/672,065, filed on even date herewith, entitled "A METHOD OF PERIPHERAL TYPE IDENTIFICATION IN A SYSTEM OF CIRCUMVENTION AND RECOVERY", hereby incorporated herein by reference, and referred to herein as the "'14157 Application".

BACKGROUND

Mission application systems that use commercial off the shelf components (COTS) are susceptible to failure when they experience hostile environments. For example, the performance of a typical COTS processor that is exposed to certain levels of radiation may suffer due to SEU (single event upset) that may result in loss of processor activity or result in erroneous calculations. To accommodate for the effects of radiation, radiation hardened processors have been developed. The performance of these types of processors is not affected by the radiation of various levels. However, radiation hardened processors in comparison to COTS processors have their limitations, in terms of size, weight, power, instructions per second, combined with high cost. With increasing processing demand, this limited Radiation hardened processing influences the applications that can be flown in space. The lack of processing performance of radiation hardened processors is especially crucial in mission application systems designed to travel in space where the speed of processing is an issue.

For the reasons stated above and for other reasons stated below which will become apparent to those skilled in the art upon reading and understanding the present specification, there is a need in the art for a system that effectively deals with hostile environments without sacrificing necessary performance to complete a mission.

SUMMARY

The above-mentioned problems of current systems are addressed by embodiments of the present invention and will be understood by reading and studying the following specification. The following summary of an embodiment is made by way of example and not by way of limitation. It is merely provided to aid the reader in understanding some of the aspects of the invention.

In one embodiment, a system is provided. The system comprises at least one non-hardened processor configured to run a plurality of mission related processes; at least one threat detector configured to detect one or more conditions which indicate the onset of a threat to the operation of the at least one non-hardened processor; and at least one hardened processor configured to elevate at least one health monitoring process of the at least one non-hardened processor from a background process to a foreground process when the at least one threat detector detects a condition indicating the onset of a threat, wherein the at least one hardened processor manages the operation of the at least one non-hardened processor based on the results of the at least one health monitoring process.

DRAWINGS

The present invention can be more easily understood and further advantages and uses thereof more readily apparent, when considered in view of the detailed description and the following figures in which.

DETAILED DESCRIPTION

Figure 1:
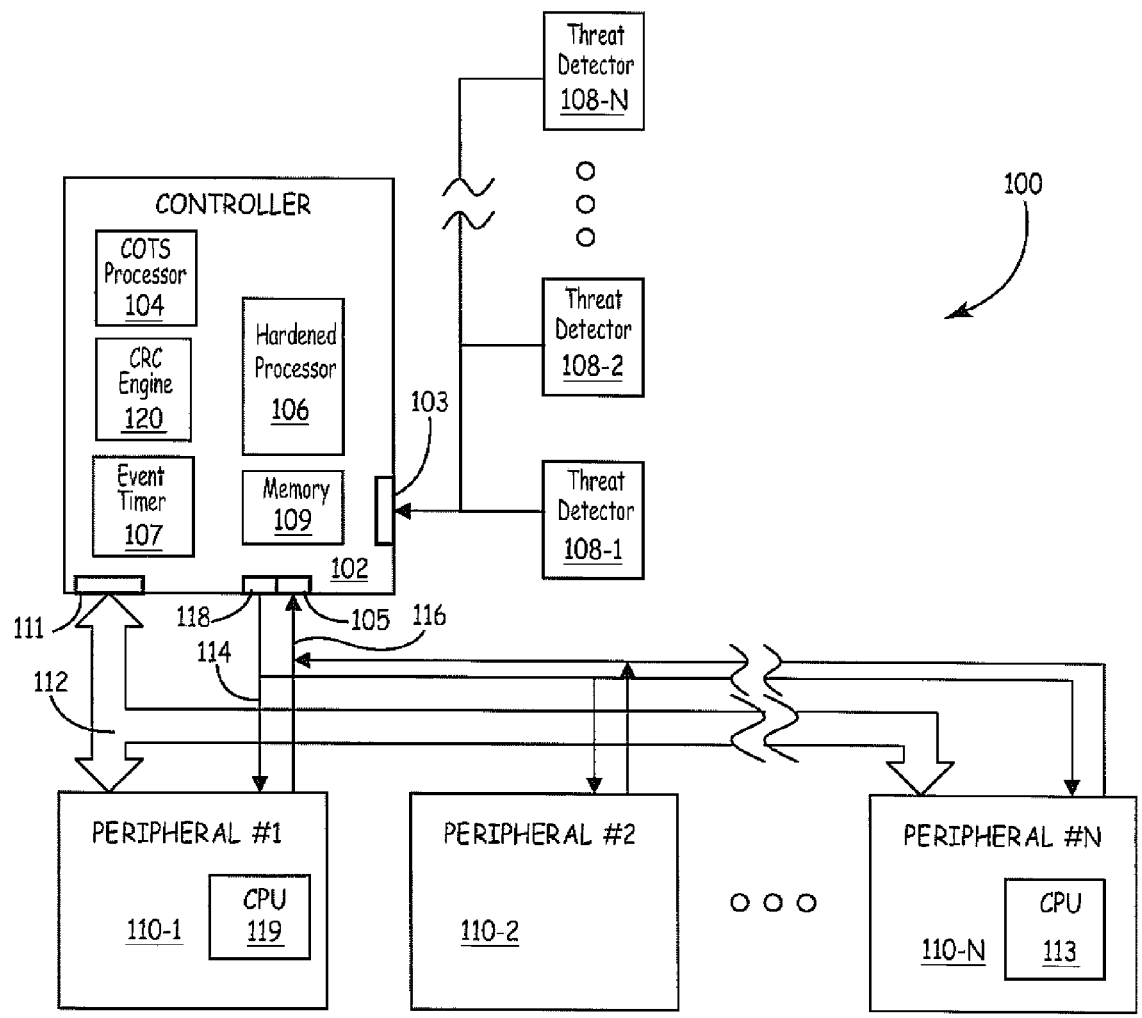
FIG. 1 is a block diagram of a system according to one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. It should be understood that the exemplary methods illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense, and the scope of the present invention is defined only by the claims and equivalents thereof.

Referring to FIG. 1, a multi-function system 100 of one embodiment of the present invention is illustrated. The multi-function system 100 includes a controller 102, event detectors 108 (1-N) (also referred to as threat detectors herein), peripherals 110 (1-N), communication channel 112 and read and write peripheral control channels 114 and 116. As illustrated, the controller 102 is in communication with the event detectors 108 (1-N). FIG. 1 illustrates a plurality of event detectors 108 (1-N). One or more event detectors 108 (1-N) are used to detect events or conditions which indicate the onset of a threat to the operation of system 100, such as radiation which can impact the function of non-radiation hardened components in system 100. Other types of event detectors are contemplated such as, but not limited to, water detectors, chemical detectors, radiation detectors, vibration detectors, seismic detectors, photon detectors, acoustic detectors, microwave detectors, radio frequency (RF) detectors, thermal detectors and the like. In fact, any type of detector that detects an event or condition that is potentially detrimental to the performance of the controller 102, the peripherals 110 (1-N) or the channels 112, 114 and 116 can be used. Moreover, different types of event detectors 108 can be used in a single system. That is, event detector 108-1 may be a different type of event detector than 108-2.

The controller 102 in the embodiment of FIG. 1 has two processors 104 and 106. Processor 106 is environmentally hardened so as to work even in the presence of conditions which pose a threat to non-hardened components. For example, in some embodiments processor 106 is environmentally hardened against radiation. Processor 104 is a relatively high speed processor 104, compared to processor 106, that is susceptible to threats or events. For example, in some embodiments, processor 104 is a commercial off-the shelf (COTS) processor that is not radiation hardened. Processors 104 and 106 use instructions for carrying out the various process tasks, calculations, and generation of signals and other data used in the operation of system 100, The instructions can be implemented in software, firmware, analog or digital electronics, or any computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASIC) and/or field programmable gate arrays (FPGA). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Due, at least in part, to its higher processing speed, processor 104 is able to more efficiently run mission related processes, such as navigation calculations and other evaluations of data, than processor 106. However, processor 106 in addition to running time critical mission application is also used to monitor and manage the operation of processor 104. Processor 106 is used to control and evaluate the results of background health monitoring processes run by processor 104. As used herein, a background process is a process which has a relatively low priority for system resources, a low iteration frequency or periodicity, and/or does not need to finish before another process can be started. In contrast, a foreground process is a process with a relatively high priority for system resources, a high iteration frequency, and/or must finish before another process can be started.

When an event detector 108 (1-N) detects an event, a signal indicating the detection is communicated to the controller 102 through port 103. Based on the received event signal, processor 106 elevates one or more background health monitoring processes to foreground processes. In particular, in some embodiments, processor 106 increases the frequency with which the health monitoring processes are run (i.e. iteration frequency or periodicity). In other embodiments, processor 106 elevates the health monitoring processes to foreground processes in other ways. For example, processor 106 can increase the priority assigned to the health monitoring processes, prevent other processes from running until the health monitoring processes have completed, and the like.

During the event, the foreground health monitoring processes help processor 106 manage the operation of processor 104 more effectively. In particular, by elevating the health monitoring processes to the foreground, processor 106 is able to more closely monitor the health of processor 104. As a result, processor 106 has more options in managing processor 104 than simply shutting off power to processor 104 during a threat. If the results of the health monitoring processes indicate that processor 104 has been negatively affected by the threat, processor 106 can allow processor 104 to continue running, but disregard mission data calculated near the time that processor 104's performance has degraded. Alternatively, processor 106 can reboot processor 104 by cycling power to processor 104, or selectively shut down processes or functions of processor 104 which have failed while allowing other processes or functions to continue running.

One exemplary health monitoring process used in some embodiments is a periodic test algorithm run by processor 104. Processor 106 monitors the results of the periodic test algorithm to determine the health of processor 104. The test or diagnostic algorithm is deterministic, scalable, and computationally intensive. The term "deterministic" means that the test algorithm generates a unique output for a given input. In addition, the term "scalable" means that the computational complexity of the test algorithm can be modified. Suitable algorithms include, but are not limited to, digital implementations of some filters (e.g. Finite Impulse Response and Infinite Impulse Response filters), correlation computations, Fast Fourier Transform (FFT) operations, Cyclic Redundancy Checksum (CRC) computations, and the like.

During operation, execution of the test algorithm is interleaved, in time, with mission processing. For example, processor 106 periodically sends signals to processor 104 to process mission processing as well as run the interleaved test algorithm. In some embodiments, the signals from processor 104 also include test input to be analyzed by processor 106 using the test algorithm. When a threat is detected by threat detectors 108 (1-N), processor 106 increases the frequency with which it sends the signals to instruct processor 104 to run the test algorithm. Once processor 104 finishes running the test algorithm, it returns to mission processing.

Processor 106 then analyzes the result of the test algorithm. Since the algorithm is deterministic in this embodiment, the result produced by processor 104 should match an expected unique result. Therefore, processor 106 verifies the produced result by comparing it to the expected result. For example, in some embodiments, processor 106 looks up the expected result in a lookup table and compares the entry in the table to the produced result. In other embodiments, such as when the computational intensity of the test algorithm is relatively low, processor 106 verifies the result by independently running the test algorithm and comparing the result produced by processor 104 with the result produced by processor 106. If the produced result does not match the expected result, the health of processor 104 has degraded.

Another exemplary health monitoring process used in some embodiments is computing instruction CRCs as the instructions are executed. In this embodiment, the instructions used in the instruction CRC health monitoring process are not test algorithms but actual mission processes. (Note: the terms "instruction", "process", and "algorithm" can be used interchangeably herein.) However, in other embodiments, the instructions used can be test algorithms. Similarly, the CRCs are calculated as the mission processes are executed for mission related purposes. Processes suitable for use in the instruction CRC health monitoring process are processes which are deterministic and which have fixed program branching. Fixed program branching refers to a unique set of program branches for a given set of mode parameters regardless of the input data. Some mission processes which meet the two criteria include, but are not limited to, some filters (e.g. Finite Impulse Response and Infinite Impulse Response filters), correlation computations, FFT operations, CRC computations, and the like. Furthermore, a pre-vent table is used, in some embodiments, to store instruction CRCs to be used during an event for determining the health of processor 104.

The instruction CRC health monitoring process is implemented, in part, through CRC engine 120. CRC engine 120 is an external peripheral inside controller 102 in this embodiment. However, in other embodiments, CRC engine 120 is located on board processor 104. CRC engine 120 can be reset and, although not required, can be configured to operate only within certain regions of memory. Configuring CRC engine 120 to operate only within certain regions of memory allows CRC engine 120 to be disabled during certain operations, such as Interrupt-Service-Routines. In addition, the results of the CRC calculations performed in CRC engine 120 are accessible to processor 106 for analysis.

During operation, processor 104 fetches instructions from memory, such as memory 109, to run using the input data. CRC engine 120 analyzes the instructions as they are fetched to calculate each instruction's CRC. Processor 106 verifies the CRCs to determine if processor 104 is executing the correct instruction at the right time by comparing the calculated CRCs to the expected CRCs. For example, processor 104 looks up the expected CRCs in a lookup table and compares them to the calculated CRCs. In some embodiments, the lookup table is stored in memory 109. If the calculated and expected CRCs do not match, processor 104 has executed the wrong instruction and/or at the wrong time indicating that the health of processor 104 has degraded. The instruction CRC test can be run regardless of the threat levels. In addition, in some embodiments, when event detectors 108 (1-N) detect a threat, processor 106 elevates the instruction CRC health monitoring process to a foreground process as described above.

Although two exemplary health monitoring processes have been described, it is to be understood that other health monitoring processes can be implemented in other embodiments. For example, other health monitoring processes include, but are not limited to, monitoring handshake exchanges between processors 106 and 104, scrubbing external memory using Error Detection and Correction (EDAC), counting the number of read-modify-writes due to EDAC, and using performance monitors of processor 104 to count interrupts, events, or types of instructions. In addition, it is to be understood that more than one health monitoring process can be used in embodiments of the present invention.

Once the event or events are over, or are determined to no longer be a threat, normal operating functions are restored by processor 106. In one embodiment, an end of event is detected by one of the event detectors 108 (1-N) and communicated back to the controller 102. In another embodiment, an event timer 107 is used to determine the end of an event. This embodiment is used when the length of an event can be accurately predicted. Other embodiments, use other commonly know methods of determining the end of an event.

Further illustrated in FIG. 1 is communication channel 112. Communication channel 112 is used to communicate between the controller 102 and peripherals 110 that have CPU's such as peripherals' 110-1 and 110-N via port 111. As illustrated Peripherals' 110-1 and 110-N include CPU's 119 and 113 respectfully. The communication channel 112 allows for the communication with and control of the respective CPU 119 and 113 by the controller 102. If a CPU 119 and 113 is to be shut down as the result of a detected event, vital data is stored in memory 109 of controller 102. When the event is over, the stored vital data is retrieved and sent back to the respective CPU 119 and 113. Communications between the controller and the peripherals 110 (1-N) are further described in the commonly assigned application Ser. No. 11/672,056 and Ser. No. 11/672,065 herein filed on the same day and incorporated herein by reference.

In embodiments of the present invention the peripherals 110 (1-N) are mixed between peripherals with COTS, peripherals that include all environmentally hardened components and peripherals that include both COTS and environmentally hardened components. Hence, the ability of each peripheral to handle a detected event will vary. Hence, in addition to managing operation of processor 104, in some embodiments, processor 106 also manages operation of one or more of peripherals 110 (1-N) for optimal performance during a detected event or events. In particular, processor 106 monitors the health of peripherals 110 (1-N) with CPUs, such as peripherals 110-1 and 110-N, and elevates background health monitoring processes to the foreground as discussed above with regards to processor 104. In addition, the health monitoring processes discussed above can be used in monitoring peripherals 110 (1-N) which have CPUs. Also, in one embodiment, the controller 102 has one or more environmentally hardened processors 106 and no relatively high speed non-hardened processor.

The controller 102 applies predefined safeguards to the peripherals 110 (1-N) based on their ability to handle the events detected. The controller 102 is in communication with the peripherals via peripheral control read channel 116 and a peripheral control write channel 114 through respective ports 105 and 118. In one embodiment, enable/disable signals are communicated across the control write lines 114. Verification of the enable/disable signals are communicated across the control read lines 116. In one embodiment, the controller 102 controls the peripherals individually. In another embodiment, the controller controls similar peripherals simultaneously.

For example, rather than shutting down peripherals when an event is detected, processor 106 in controller 102 allows peripherals to run in full capacity until failure of the peripheral is detected by the health monitoring processes. Processor 106 then determines if it is necessary to cycle power in the failed peripheral. Alternatively, processor 106 selectively shuts down portions of peripherals 110 (1-N) which are not able to survive the threat. In addition, in other embodiments, vital functions can be run in limited capacity, peripheral memory can be archived as discussed above, and/or other actions can be taken to minimize disruptions from detected threats. Thus, through continued communication between processor 106 of controller 102 and peripherals 110 (1-N) over communication channel 112, vital functions continue to run while being monitored.

Hence, embodiments of the present invention enable dynamic control of peripherals 110 (1-N) during a detected event or events. In addition, embodiments of the present invention enable system 100 to take advantage of the benefits of COTS processors and components by enabling dynamic monitoring and protection of the COTS components during a detected event. In embodiments of the present invention, the circumvention (e.g. dynamic control of peripherals 110 (1-N)

and processor 104) is not limited to a one time event. Moreover, embodiments can handle multiple events that overlap in time.

Figure 2:
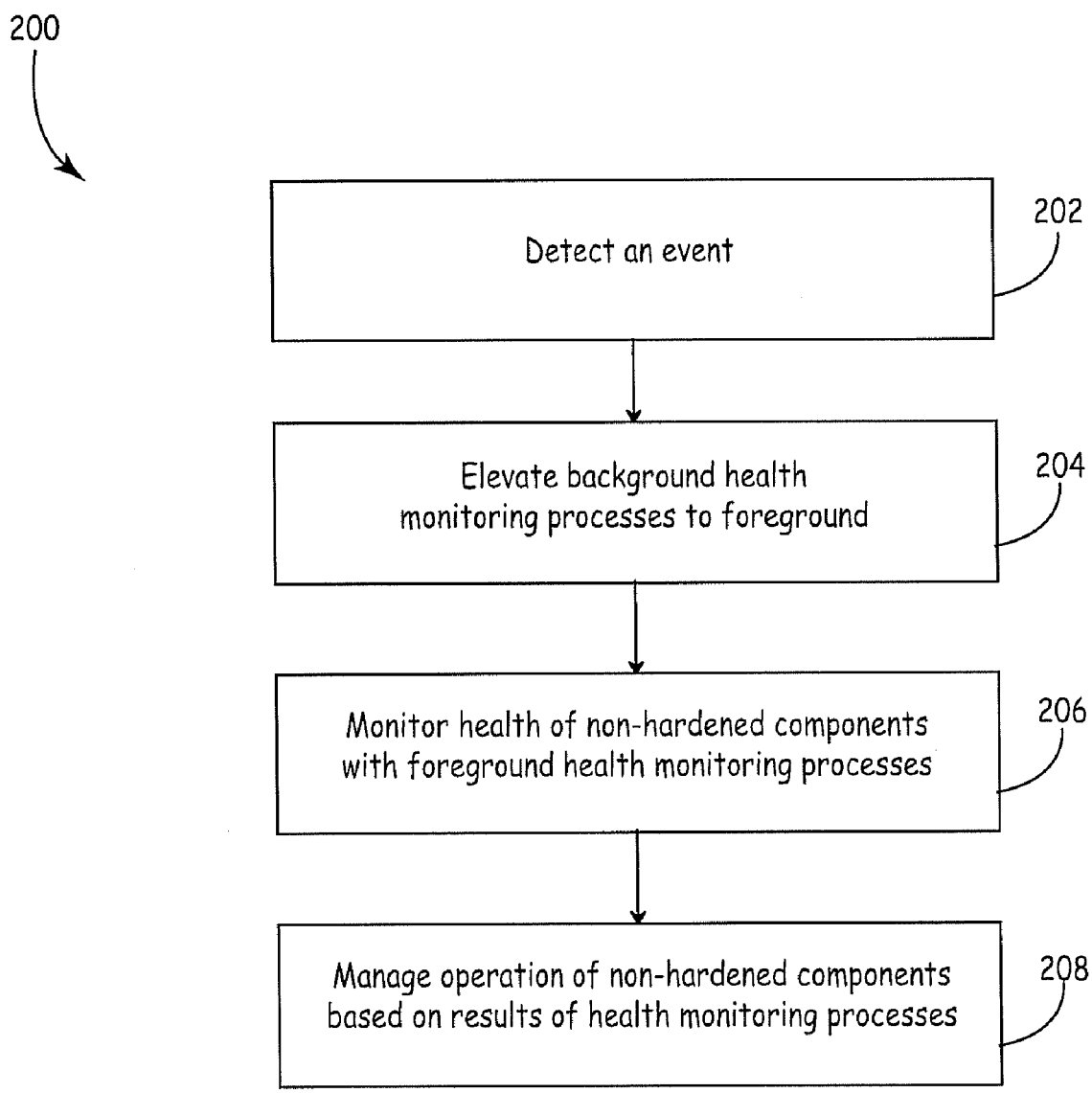
FIG. 2 is a flow chart depicting a method of managing a system during a threat according to one embodiment of the present invention.

FIG. 2 is flow chart depicting a method 200 of managing a system during a threat according to one embodiment of the present invention. Method 200 is implemented in a system such as system 100 above. At 202, an event or threat is detected by event detectors such as event detectors 108 (1-N) in FIG. 1. For example, the event detectors can detect radiation, water, vibration, heat, etc. A hardened processor, therefore, is one that is not susceptible to the threats as described above.

At 204, in response to the detected threat, background health monitoring tasks are elevated to foreground health monitoring tasks. For example, the priority, iteration frequency, etc. are increased as described above. At 206, the health of non-hardened components is monitored via the foreground health monitoring processes. In particular, a hardened processor evaluates the results obtained by the health monitoring processes to determine the health of non-hardened components. In addition, health monitoring tasks include, but are not limited to, running test algorithms, calculating instruction CRCs, monitoring handshake exchanges between hardened and non-hardened processors, scrubbing external memory using Error Detection and Correction (EDAC), counting the number of read-modify-writes due to EDAC, and using performance monitors of non-hardened processors to count interrupts, events, or types of instructions. Exemplary health monitoring processes are described in more detail in FIGS. 3 and 4.

At 208, operation of the non-hardened components is managed by the hardened processor based on the analysis of the results from the health monitoring processes. For example, non-hardened components can be allowed to run during a hostile event, or portions of non-hardened components can be selectively shut down, etc. In particular, in one embodiment, a hardened processor manages operation of one or more peripherals having a non-hardened processor. The hardened processor selectively shuts down portions of the peripheral which have failed or cannot otherwise survive the detected event. However, portions of the peripheral which have not failed continue to operate. Through continued communication between the hardened processor and peripherals (e.g. over communication channel 112 in FIG. 1) using an established communication protocol, the hardened processor is able to determine which portions to shut down, which portions to run in a limited capacity, and which portions to run at full capacity.

Hence, as opposed to simply shutting down non-hardened components during hostile events, embodiments of the present invention enable non-hardened components to continue operating in at least some capacity by managing operation of the non-hardened components based on health monitoring processes. In addition, the health monitoring processes are brought to the foreground to assist the hardened processor in managing operation of the non-hardened components. Allowing the non-hardened components to continue operation is particularly important for mission critical processes which are being run by the non-hardened components.

Figure 3:
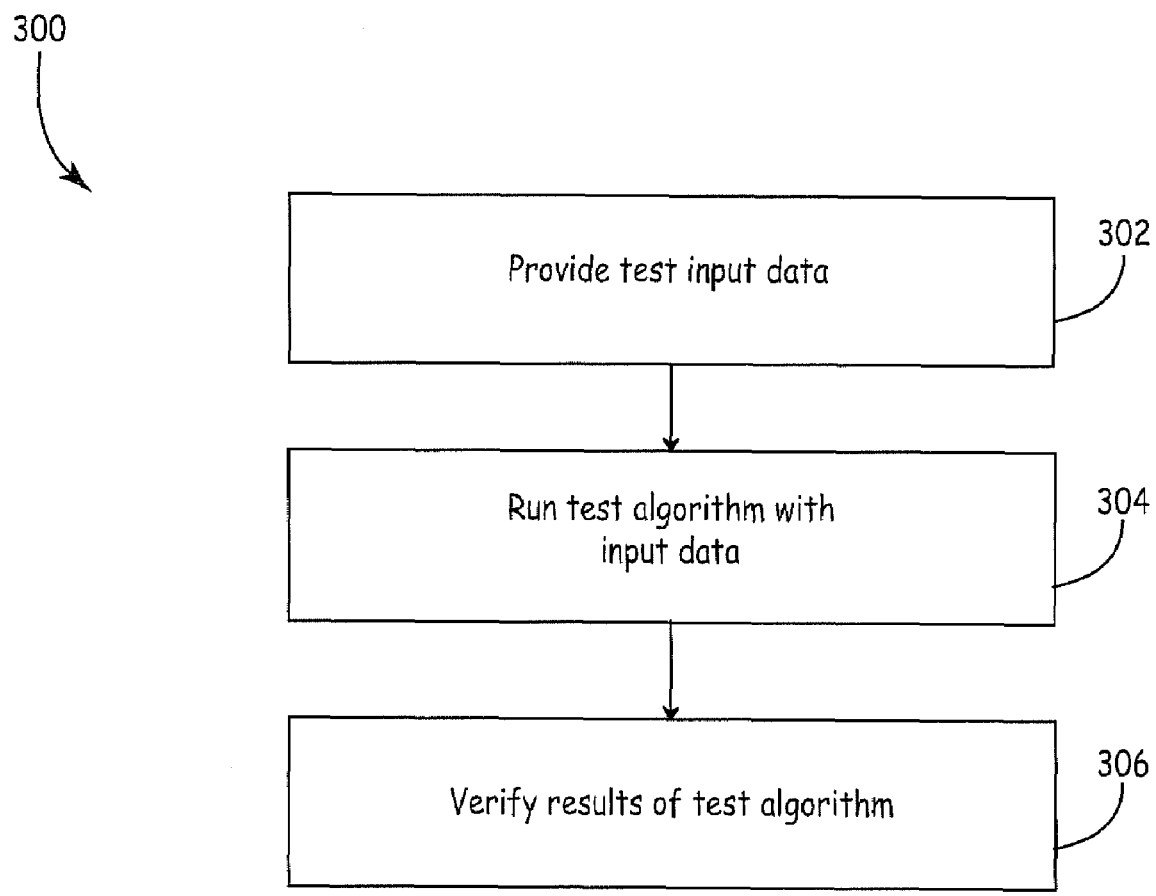
FIG. 3 is a flow chart depicting a method of monitoring the health of a non-hardened processor according to one embodiment of the present invention.

FIG. 3 is a flow chart depicting a method 300 of monitoring the health of a non-hardened processor according to one embodiment of the present invention. At 302, test input data is provided to the non-hardened processor (e.g. processor 104 in FIG. 1). In some embodiments, a hardened processor (e.g. processor 106 in FIG. 1) provides the test input data. In other embodiments, the test data is located in memory and retrieved by the non-hardened processor. At 304, the non-hardened processor runs a test algorithm using the test input data. The test algorithm is deterministic as described above. In addition, in some embodiments, the test algorithm is also scalable and/or computationally intensive as described above.

At 306, the results of the test algorithm are verified by the hardened processor. Since the test algorithm is deterministic, the test algorithm should produce a unique result for given input data if the non-hardened processor is operating correctly. The results are verified, in one embodiment, by comparing the results produced by the non-hardened processor with a corresponding entry in a look-up table. The expected results in the corresponding look-up table are determined by running the test algorithm with the non-hardened processor in a known safe environment in one embodiment. If the produced results do not match the corresponding entry in the look-up table, then the health of the non-radiation hardened processor is failing. In another embodiment, the hardened processor generates a result by running the same test algorithm with the same input data. The hardened processor then compares its produced results with the results produced by the non-hardened processor. If the two results do not match, the non-hardened processor has failed.

Figure 4:
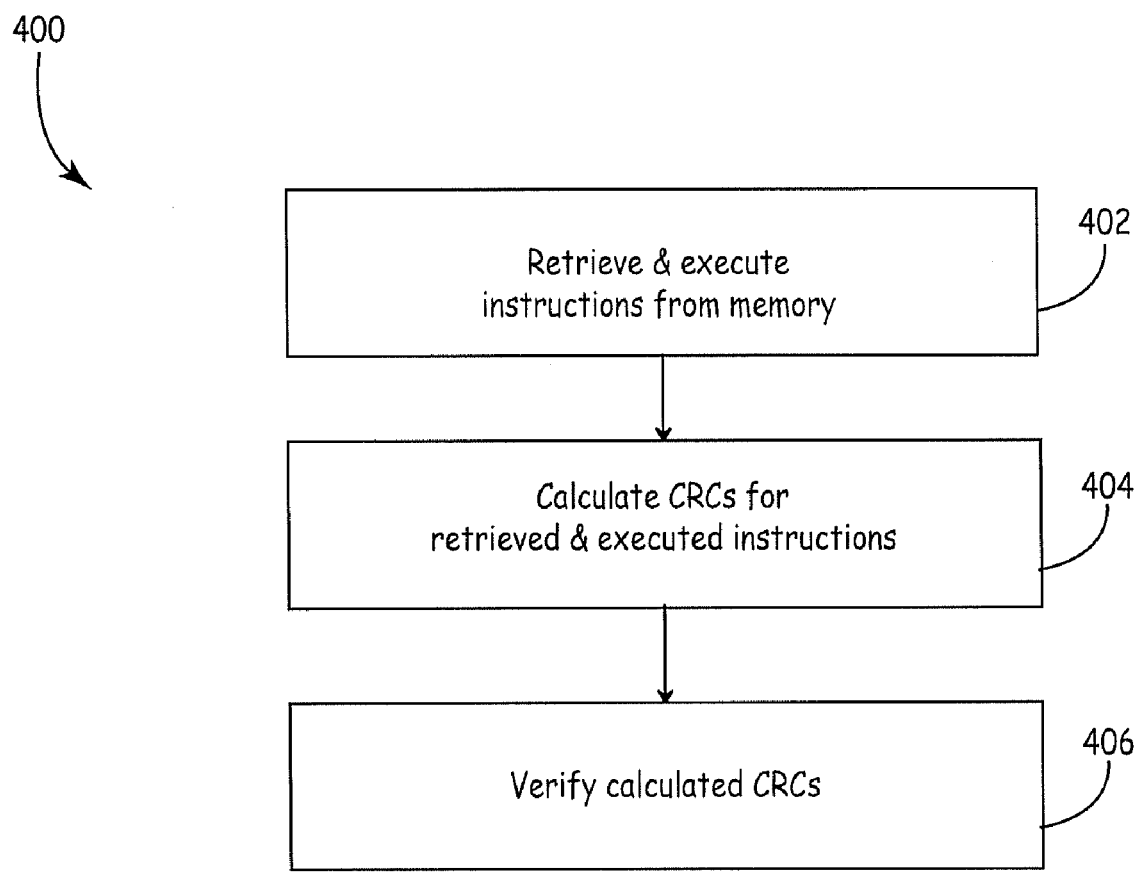
FIG. 4 is a flow chart depicting another method of monitoring the health of a non-hardened processor according to one embodiment of the present invention.

FIG. 4 is flow chart depicting a method 400 of monitoring the health of a non-hardened processor according to one embodiment of the present invention. At 402, the non-hardened processor retrieves and executes instructions from memory. The instructions retrieved have fixed program branching as described above. In addition, the instructions retrieved are instructions for mission related processes in some embodiments. In other embodiments, the instructions retrieved are test instructions.

At 404, CRCs are calculated as the instructions are retrieved. The CRCs are calculated in some embodiments, by a CRC engine such as CRC engine 120 in FIG. 1. At 406, a hardened processor compares the calculated CRCs to expected CRCs for the retrieved instructions. For example, in one embodiment, the hardened processor looks up the expected CRCs in a look-up table and compares the entries in the look-up table to the calculated CRCs. Since the instructions have fixed program branching, if the CRCs do not match, the hardened processor has not executed the right instruction at the right time. Therefore, this is an indication that the health of the non-hardened processor has degraded or failed.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system comprising:
at least one non-hardened processor configured to run a plurality of mission related processes;
at least one threat detector configured to detect one or more conditions which indicate the onset of a threat to the operation of the at least one non-hardened processor; and
at least one hardened processor configured to elevate at least one health monitoring process of the at least one non-hardened processor from a background process to a foreground process when the at least one threat detector detects a condition indicating the onset of a threat, wherein the at least one hardened processor manages the operation of the at least one non-hardened processor based on the results of the at least one health monitoring process.

2. The system of claim 1, wherein the at least one threat detector comprises one or more of a water detector, a chemical detector, a radiation detector, a vibration detector, a seismic detector, a photon detector, an acoustic detector, a microwave detector, a radio frequency (RF) detector, and a thermal detector.

3. The system of claim 1, further comprising:
a hardened cyclic redundancy check (CRC) engine coupled to the at least one non-hardened processor, wherein the at least one health monitoring process includes computing a CRC of at least one program instruction as the program instruction is retrieved for execution by the at least one non-hardened processor, wherein the at least one hardened processor is configured to compare the computed CRC to a known CRC of the at least one program instruction.

4. The system of claim 1, wherein the at least one health monitoring process includes running a deterministic test algorithm, wherein the at least one hardened processor is configured to verify the results of the deterministic test algorithm.

5. The system of claim 4, wherein the deterministic test algorithm comprises one or more of a Fast Fourier Transform (FFT), a Cyclic Redundancy Checksum (CRC) computation, a Finite Impulse Response filter operation, an Infinite Impulse Response filter operation, and a correlation computation.

6. The system of claim 4, wherein the at least one hardened processor is further configured to verify the results of the test algorithm by one or more of comparing the results of the test algorithm to expected results retrieved from a look-up table, and running the test algorithm to compare the results produced by the at least one non-hardened processor with the results produced by the at least one hardened processor.

7. The system of claim 1, further comprising at least one peripheral, wherein the at least one non-hardened processor is located in one or more of the at least one peripheral and a controller in which the hardened processor is also located.

8. The system of claim 7, wherein the at least one hardened processor is configured to selectively shut down portions of the at least one peripheral based on the results of the health monitoring.

9. A method of managing a system, the method comprising:
Detecting an event;
Elevating one or more background health monitoring processes to one or more foreground health monitoring processes when the event is detected, wherein the background process has at least one of relatively low priority for system resources, a low iteration frequency and does not need to finish before another process can be started;
Monitoring the health of a non-hardened component via the one or more foreground health monitoring processes; and
Managing operation of the non-hardened component based on the one or more foreground health monitoring processes.

10. The method of claim 9, wherein detecting an event comprises detecting one or more of radiation, vibration, water, heat, and chemicals.

11. The method of claim 9, wherein elevating one or more background health monitoring processes to foreground health monitoring processes comprises at least one of increasing the priority of the one or more background health monitoring processes; and increasing the periodicity of the one or more background health monitoring processes.

12. The method of claim 9, wherein monitoring the health of a non-hardened component comprises at least one of monitoring handshake exchanges between hardened and non-hardened processors; scrubbing external memory using Error Detection and Correction (EDAC), counting the number of read-modify-writes due to EDAC; and
using performance monitors of non-hardened processors to count interrupts, events, or types of instructions.

13. The method of claim 9, wherein monitoring the health of the non-hardened component comprises:
providing test input data to the non-hardened component;
running a test algorithm with the test input data in the non-hardened component; and
verifying the results produced by running the test algorithm.

14. The method of claim 13, wherein running a test algorithm comprises at least one of performing a Fast Fourier Transform (FFT) computation; calculating a Cyclic Redundancy Checksum (CRC); performing a Finite Impulse Response filter operation;
performing an Infinite Impulse Response filter operation, and performing a correlation computation.

15. The method of claim 13, wherein verifying the results produced by running the test algorithm comprises looking up expected results in a look-up table and comparing the produced results to the expected results.

16. The method of claim 9, wherein monitoring the health of the non-hardened component comprises:
retrieving one or more instructions for execution from memory;
calculating Cyclic Redundancy Checksums (CRC) as each instruction is retrieved; and
verifying the calculated CRCs.

17. The method of claim 16, wherein retrieving one or more instructions for execution comprises at least one of retrieving one or more test instructions; and
retrieving one or more mission related instructions.

18. The method of claim 16, wherein verifying the calculated CRCs comprises looking up expected CRCs in a look-up table; and comparing the calculated CRCs to the expected CRCs.

19. A program product comprising program instructions embodied on a processor-readable medium for execution by a hardened programmable processor included, wherein the program instructions are operable to cause the hardened programmable processor to:
elevate one or more background health monitoring processes of at least one non-hardened processor to one or more foreground health monitoring processes;
evaluate the results of the one or more foreground health monitoring processes; and
manage operation of the at least one non-hardened processor based on the evaluated results of the one or more foreground health monitoring processes.

20. The program product of claim 19, wherein the program instructions are further operable to cause the hardened programmable processor to elevate the one or more background health monitoring processes by at least one of increasing the priority of the one or more background health monitoring processes and increasing the periodicity of the one or more background health monitoring processes.

* * * * *